United States Patent
Dehne et al.

[15] 3,672,306
[45] June 27, 1972

[54] CONVEYOR CARRIER WITH PIVOTAL MOTION DAMPING LOAD SUSPENSION

[72] Inventors: Clarence A. Dehne, Farmington; Harold A. Folsom, Livonia, both of Mich.

[73] Assignee: Jervis B. Webb Company

[22] Filed: Nov. 10, 1970

[21] Appl. No.: 88,314

[52] U.S. Cl. ................104/89, 104/93, 105/148, 188/140 R
[51] Int. Cl. ................................................B61b 3/00
[58] Field of Search...............104/89, 93; 105/148; 188/1 B, 188/136, 140 R; 198/179; 212/3, 132; 214/15 R; 294/78 R

[56] References Cited

UNITED STATES PATENTS

| | | |
|---|---|---|
| 2,355,827 | 8/1944 | Stelzer ..........................188/140 R |
| 3,029,906 | 4/1962 | Gauley..........................188/136 |
| 3,085,659 | 4/1963 | Ashmead ..........................188/140 R |
| 3,229,645 | 1/1966 | Dehne ........................................104/96 |
| 3,401,804 | 9/1968 | Link .........................................212/3 |
| 3,534,995 | 10/1970 | Heikkinen..........................294/78 R |

*Primary Examiner*—Drayton E. Hoffman
*Attorney*—Farley, Forster and Farley

[57] ABSTRACT

A pivotal motion damping suspension for the load carrying portion of a conveyor carrier includes a tubular bearing member secured to the load carrying portion and internally slideably engaged by a pair of bearing segments mounted on the track supported portion of the carrier. The bearing segments engage the tubular bearing member at circumferentially spaced locations thereon, and swinging motion of the load carrying portion in either direction produces an increased force normal to one of the bearing segments and an increase in the frictional resistance between such bearing segment and the tubular bearing member which brakes and dampens swinging motion.

10 Claims, 5 Drawing Figures

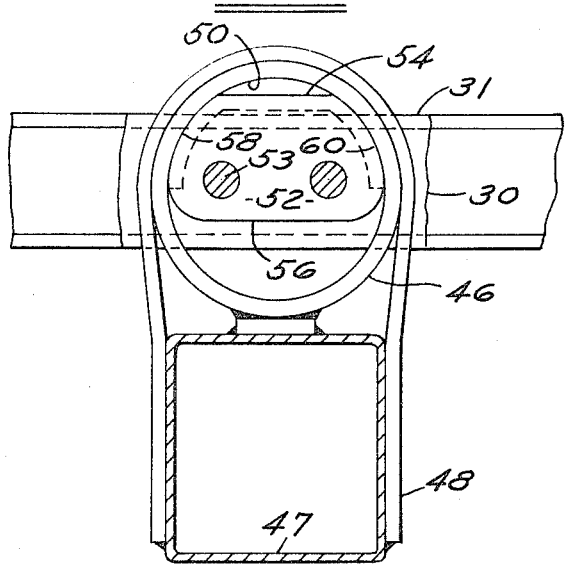
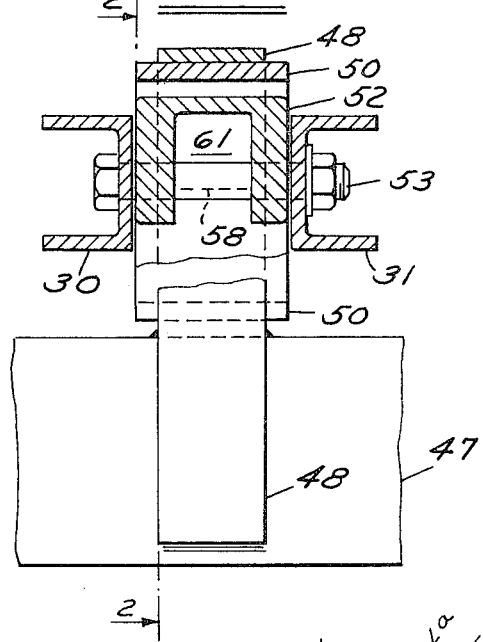
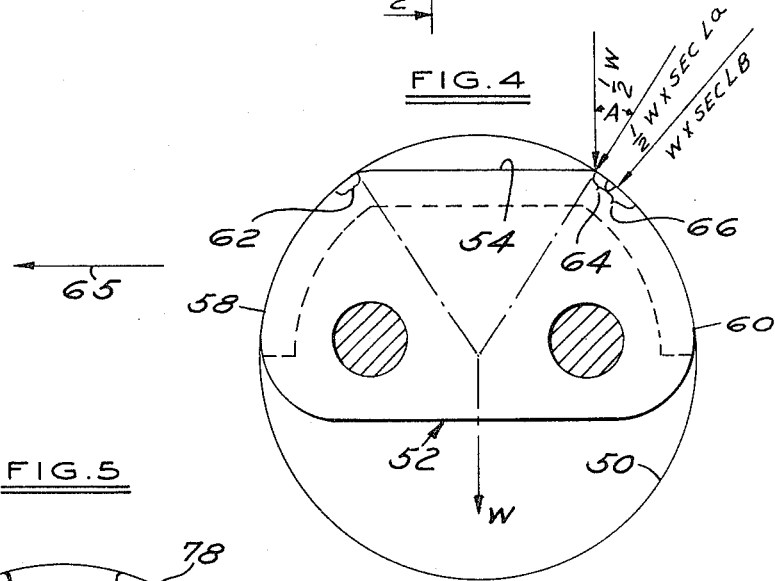
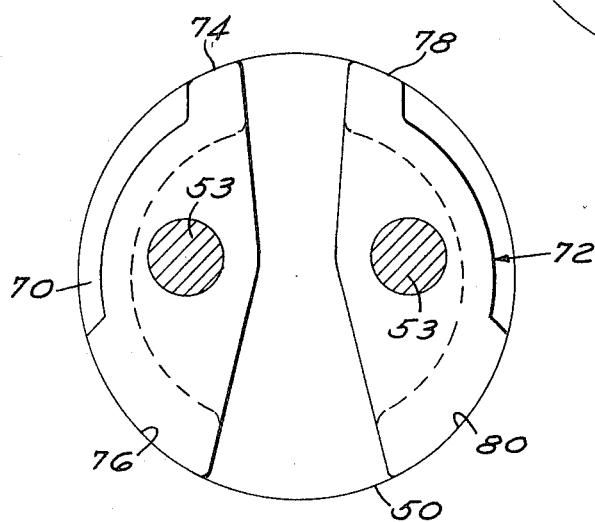

CONVEYOR CARRIER WITH PIVOTAL MOTION DAMPING LOAD SUSPENSION

BACKGROUND OF THE INVENTION

This invention relates to an improved construction for pivotally suspending the load carrying portion of a conveyor carrier from the portion of the carrier which is supported on an overhead conveyor track, and damping pivotal movement of the load carrying portion about an axis transverse to the path of carrier travel.

Carriers of overhead trolley conveyors and overhead power and free conveyors have conventionally included a pivotal connection between the load carrying and track supported portions of the carrier on a horizontal axis transverse to the path of carrier travel in order that the load carrying portion will maintain a level attitude along a vertical curve in the track. When a carrier is stopped or started, this pivotal connection also permits a pendulous motion of the load carrying portion which is particularly objectionable in overhead power and free systems where carriers are frequently stopped at stations along the path of travel for loading, unloading or performing some operation on a load being carried. These stations frequently include equipment with which the load carrying portion of the carrier must be relatively precisely positioned in order for the operation to be performed, and in some instances it has been necessary to provide an auxiliary device at a station for quickly damping the pendulous motion which is set up when the carrier is stopped. In power and free systems where successive carriers can accumulate behind a stopped carrier, the pendulous motion of the load carrying portion may require extra length in the track supported portion of the carrier in order to provide clearance between adjacent carriers.

The object of the present invention is to provide a pivotal suspension for the load carrying portion of a conveyor carrier which will permit the free pivotal movement necessary to maintain a proper attitude of the load on a vertical curve of the conveyor track, and which will also provide a braking or damping action to resist the pendulous movement of the load carrying portion when the carrier is stopped or started.

SUMMARY OF THE INVENTION

According to the invention, a conveyor carrier having a track supported portion and a load carrying portion suspended therefrom for swinging movement in the path of carrier travel, includes an improved suspension for damping such swinging movement comprising bearing means secured to one of the carrier portions and providing an arcuate bearing surface, and combined bearing and braking means secured to the other of the carrier portions and providing at least a pair of arcuate bearing segments slideably engaging said arcuate bearing surface at circumferentially spaced locations thereon whereby a swinging movement of the load carrying portion in either direction produces an increase in the force normal to one of the pair of bearing segments and a corresponding increase in the frictional resistance generated between said one bearing segment and the arcuate bearing surface engaged thereby.

Preferably, the arcuate bearing surface of the bearing means may be formed by the inner surface of a tubular member secured to the load carrying portion of the carrier; and, the pair of arcuate bearing segments of the combined bearing and braking means are formed on a bearing block secured to the track supported portion of the carrier. The arrangement is such that when the load supporting portion of the carrier is in a centered position relative to a vertical plane passing through the axis of the tubular bearing member, the bearing segments engage the inner surface of the tubular member at locations spaced equidistant from and on either side of such vertical plane. Each bearing segment then carriers one-half of the load, and the forces normal to each of the bearing segments are equal, which forces in large part determine the frictional resistance to relative movement between each bearing segment and the inner surface of the tubular bearing member. A swinging movement of the load carrying portion of the carrier will result in a change in the load distribution on the bearing segments and an increase in the frictional force between one of the bearing segments and the tubular bearing member far greater than any decrease in such frictional force between the other bearing segment and tubular bearing member. The relation between these frictional forces and the load can be controlled by the design of the bearing segments, as will be described hereinafter, together with other features and advantages of the invention.

DESCRIPTION OF THE DRAWINGS

FIG. 2 is an enlarged sectional detail taken as indicated by the line 2—2 of FIG. 3, and showing the improved pivotal suspension of the load carrying portion of the carrier;

FIG. 3 is an enlarged sectional detail of the structure shown in FIG. 2, taken as indicated by the line 3—3 of FIG. 1;

FIG. 4 is a schematic illustration similar to FIG. 2 indicating the forces applied to the suspension by the weight of the load carrying portion of the carrier; and, FIG. 5 is a view similar to FIG. 2 showing an alternate form of construction of the pivotal suspension.

DESCRIPTION OF THE PREFERRED EMBODIMENTS

Figure 1:
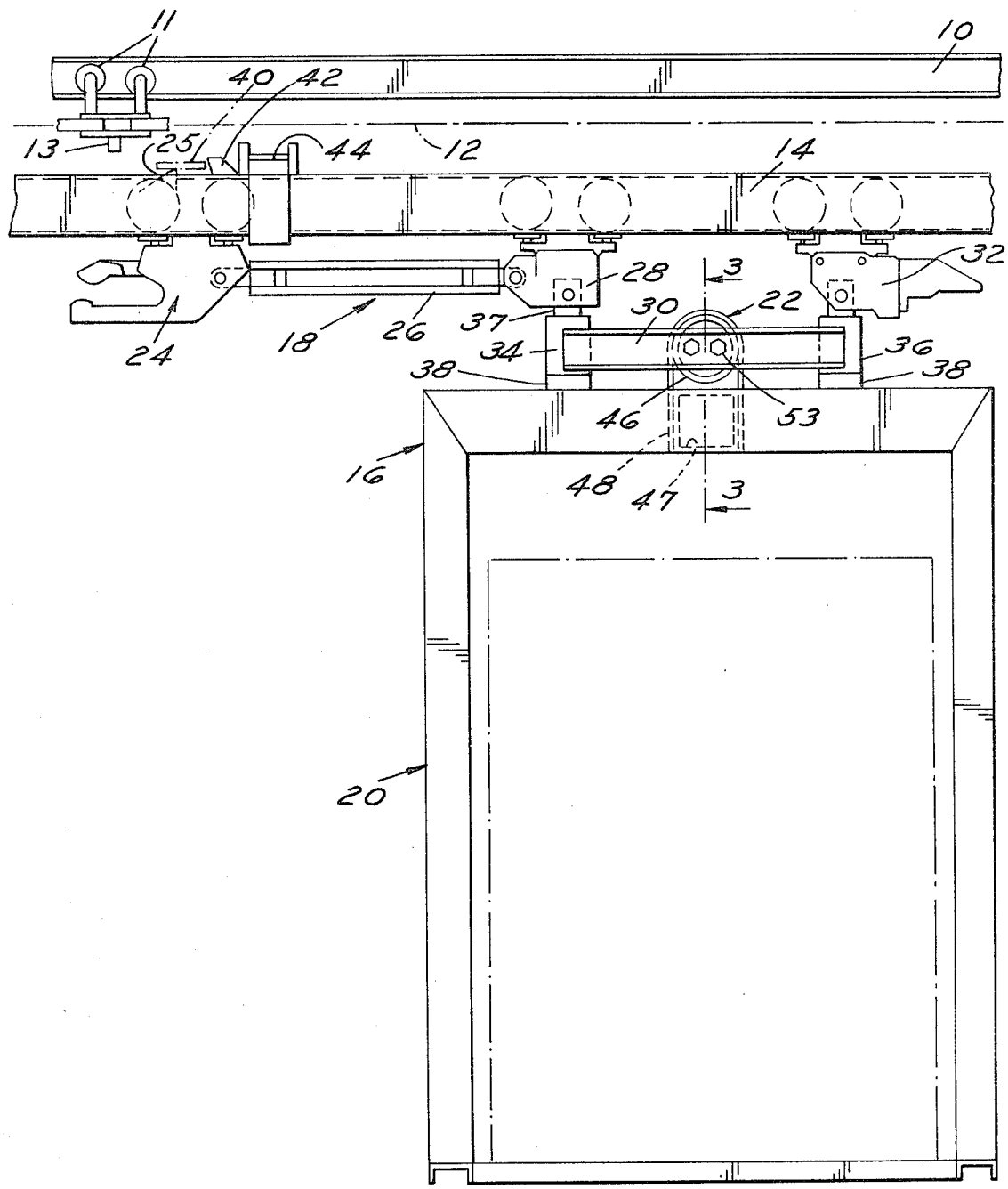
FIG. 1 is a side elevation of an overhead power and free conveyor and carrier utilizing the present invention.

The power and free conveyor shown in FIG. 1 is conventional, including an upper track 10 supporting trolleys 11 connected to a driven chain 12 equipped with pushers 13, and a lower track 14 supporting a carrier 16.

The carrier 16 has a track supported portion 18 and a load carrying portion 20 suspended therefrom by the improved suspension 22 of the invention for swinging movement in the path of carrier travel along the track 14. Except for the pivotal suspension 22, the carrier construction illustrated is representative only. Any carrier of an overhead conveyor, either an overhead trolley conveyor or an overhead power and free conveyor, has a track supported portion and a load carrying portion. The track supported portion may consist of a trolley or trolleys to which the load carrying portion is connected, or an assembly of trolleys and a load bar to which the load carrying portion is connected, as illustrated. In the carrier 16, a forward driving trolley 24, having a driving dog 25, is connected by a towing link 26 to an intermediate load carrying trolley 28 in turn connected by a pair of load bars 30 and 31 to a rear load carrying trolley 32, the ends of the load bars being secured to sleeves 34 and 36 rotatably mounted on pins 37 pivoted on the body of the trolleys 28 and 32 and each pin 37 being equipped with a thrust bearing 38.

FIG. 1 shows the carrier 16 stopped at a station along the path of the conveyor by the action of a stop plate 40 which engages and depresses the driving dog 25 and is abutted by a holdback dog 42 on the driving trolley 24 in a manner further described in U.S. Pat. No. 3,229,645, with rebounding movement of the carrier being prevented by an anti-backup pawl 44. The arresting action of stop plate 40 on the carrier 16 is relatively abrupt, as is the starting action when the stop plate is withdrawn and the then extended driving dog 25 is engaged by the next oncoming pusher 13. Objectionable pendulous swinging of the load carrying portion 20 of the carrier resulting from this stopping and starting action is dampened by the construction of the pivotal suspension 22, best shown in FIGS. 2–4.

This construction includes a cylindrical tubular bearing member 46 secured to a cross member 47 forming part of the load carrying portion of the carrier and to a strap 48 also secured to the cross member 47, an arcuate bearing surface 50 being provided by the internal cylindrical surface of the tubular bearing member 46. The arcuate bearing surface 50 is slidably engaged by combined bearing and braking means in the form of a bearing block 52 secured by a pair of bolts 53 to the load bars 30 and 31 of the track supported portion 18 of the carrier. The bearing block 52, in end elevation as shown in FIGS. 2 and 4, is essentially in the shape of a cylindrical section truncated by a pair of planes parallel to each other and to the axis of the cylinder, these planes defining upper and lower truncated surfaces 54 and 56 and resulting in the bearing block being provided with a pair of arcuate bearing segments 58 and 60. In the construction shown, the bearing block 52 is formed with an internal recess 61 (FIG. 3).

As best shown in FIG. 4, the arcuate segments 58 and 60 of the bearing block 52 engage the internal surface 50 of the tubular member 46 at circumferentially spaced locations thereon, the segments 58 and 60 being arranged symmetrically relative to a plane through the axis of the tubular member 46 midway between the segments. When the weight W of the load carrying portion is acting in this plane, for example when the track supported portion of the carrier 18 is horizontal and the load carrying portion 20 is stable, the segment 58 is engaged by the tubular member 46 in the area 62 with substantially line contact and carries one-half the load; similarly the segment 60 is contacted by the tubular member 46 in the area 64 and carries the remaining one-half of the load. However, the frictional force resisting relative movement between the tubular bearing member 46 and bearing block 52 acts in a direction normal to the bearing surfaces in contact with each other, and this frictional force at each of the contacting areas 62 and 64 is equal to ½W multiplied by the secant of the angle A between the line of action of the weight of the load and a line normal to the contacting bearing surfaces.

If it be assumed that FIG. 4 represents a stable condition with the carrier in motion to the left, as indicated by the arrow 65, and the carrier is stopped by the stop plate 40, the tubular bearing member 46 secured to the load carrying portion of the carrier will swing in a clockwise direction with the result that the combination of the weight of the load carrying portion 20 of the carrier and the deceleration force acting thereon will be vectorially summed and produce a shift in the magnitude and location of forces acting upon the segments 58 and 60 of the bearing block 52. Contact between the segment 60 and the surface 50 of the tubular bearing member 46 will shift in a clockwise direction to the area 66, and result in an increased frictional force acting on the contacting bearing surfaces and an increased frictional resistance to relative movement therebetween.

It can be seen that the configuration of the bearing block 52 utilizes the multiplying effect of the secant of the angle between the line of action of the load and the line of action of the forces normal to the bearing surfaces. If the upper surface 54 of the bearing block 52 is made more truncated, or made as a chord of a larger arc on the internal surface 50 of the tubular bearing member 56, the angle A will be increased and the frictional force correspondingly increased. In fact, if too large an angle A is utilized the pivot assembly 22 could be self-locking which would be undesirable, as the pivot construction must permit freedom of relative pivotal movement for the carrier to transverse vertical curves.

An alternate embodiment of the invention is shown in FIG. 5. Twin bearing and braking blocks 70 and 72 are mounted within the tubular bearing member 46, each of the blocks being pivotally supported between the load bars 30 and 31 on one of the bolts 53. The bearing and braking member 70 has an upper load supporting or bearing segment 74 and a circumferentially spaced braking segment 76; likewise, the bearing and braking member 72 has an upper bearing surface 78 and a circumferentially spaced braking surface 80. The members 70 and 72 are symmetrically arranged within the tubular member 46 so that when the load carrying portion of the carrier is in a stable condition, one-half of the load is supported by each of the surfaces 74 and 78. A swinging movement of the carrier in either direction will result in increasing the load supported by one of the segments 74 and 78, and will cause this segment to pivot to produce an increased frictional force between the braking surface 76 or 80 and the cylindrical surface 50 of the tubular member 46. The extent to which the braking force can be increased will depend upon the relative location of the pivotal axis of the combined bearing and braking member and the length of the lever arms through which the load forces act.

We claim:

1. In a conveyor carrier having a track supported portion and a load carrying portion suspended therefrom for swinging movement in the path of carrier travel, an improved suspension for damping such swinging movement comprising bearing means secured to one of the carrier portions and providing an arcuate bearing surface, and combined bearing and braking means secured to the other of the carrier portions and providing at least a pair of arcuate bearing segments slideably engaging said arcuate bearing surface at circumferentially spaced locations thereon whereby a swinging movement of the load carrying portion in either direction produces an increase in the force normal to one of the pair of bearing segments and a corresponding increase in the frictional resistance generated between said one bearing segment and the arcuate bearing surface engaged thereby.

2. A conveyor carrier according to claim 1 wherein the bearing means comprises a cylindrical member.

3. A conveyor carrier according to claim 2 wherein the cylindrical member is tubular and the arcuate bearing surface is formed by the internal surface thereon.

4. A conveyor carrier according to claim 1 wherein the combined bearing and braking means comprises a pair of rigidly connected arcuate bearing segments.

5. A conveyor carrier according to claim 1 wherein the combined bearing and braking means comprises a pair of members each having a load supporting segment and a circumferentially spaced braking segment, and pivot means individually supporting each of the pair of members for movement of the braking segment thereof into engagement with the arcuate bearing surface with increasing force in response to swinging movement of the load carrying portion in one direction.

6. A conveyor carrier according to claim 1 wherein the bearing means comprises a cylindrical tubular member having the arcuate bearing surface on the inner surface thereof, and the combined bearing and braking means comprises a pair of rigidly connected cylindrical segments arranged symmetrically relative to a plane through the axis of the cylindrical tubular member midway between the segments.

7. A conveyor carrier according to claim 6 wherein the cylindrical tubular member is secured to the load carrying portion of the carrier and swings therewith, and the cylindrical segments are fixed to the track supported portion of the carrier.

8. A conveyor carrier according to claim 1 wherein the bearing means comprises a cylindrical tubular member having the arcuate bearing surface on the inner surface thereof, and the combined bearing and braking means comprises a pair of members each having a load supporting segment and a circumferentially spaced braking segment, and pivot means individually supporting each of the pair of members in symmetrical relation to the axis of the tubular member for movement of said braking segment into engagement with the bearing surface of the tubular member with increasing force in response to swinging movement of the load carrying portion in one direction.

9. A conveyor carrier according to claim 8 wherein the cylindrical tubular member is secured to the load carrying portion of the carrier and swings therewith, and the combined bearing and braking members are pivotally secured to the track supported portion of the carrier.

10. A conveyor carrier according to claim 1 wherein the increase in the force normal to one of the bearing segments is proportional to the secant of the angle between the line of action of the load carrying portion on the one bearing segment and a line normal to the arcuate bearing surface at the area of contact of the one bearing segment therewith.

* * * * *